US012609851B2

(12) United States Patent
    Kutz et al.

(10) Patent No.: US 12,609,851 B2
(45) Date of Patent: Apr. 21, 2026

(54) DYNAMIC PRE-EQUALIZATION SWITCHING FOR WIRELESS TRANSMISSIONS

(71) Applicant: QUALCOMM Incorporated, San Diego, CA (US)

(72) Inventors: Gideon Shlomo Kutz, Ramat Hasharon (IL); Assaf Touboul, Netanya (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 18/542,347

(22) Filed: Dec. 15, 2023

(65) Prior Publication Data

US 2025/0202740 A1     Jun. 19, 2025

(51) Int. Cl.
    *H04L 25/03* (2006.01)
    *H04B 1/12* (2006.01)
(52) U.S. Cl.
    CPC ......... *H04L 25/03343* (2013.01); *H04B 1/12* (2013.01)
(58) Field of Classification Search
    CPC ............................. H04L 25/03343; H04B 1/12
    See application file for complete search history.

(56) References Cited

U.S. PATENT DOCUMENTS

| | | | | |
|---|---|---|---|---|
| 2013/0223506 A1* | 8/2013 | Kolze | .................... | H04L 27/01 |
| | | | | 375/232 |
| 2013/0330070 A1* | 12/2013 | Yu | ........................ | H04B 10/541 |
| | | | | 398/16 |
| 2014/0133867 A1* | 5/2014 | Fujimori | .......... | H04B 10/50572 |
| | | | | 398/183 |
| 2016/0204822 A1* | 7/2016 | Yu | ..................... | H04L 27/26416 |
| | | | | 375/219 |
| 2023/0318638 A1* | 10/2023 | Agrawal | ........... | H04L 25/03343 |
| | | | | 375/297 |
| 2024/0388478 A1* | 11/2024 | Barak | ................... | H04L 5/0048 |

* cited by examiner

*Primary Examiner* — Dac V Ha

(74) *Attorney, Agent, or Firm* — Procopio, Cory, Hargreaves & Savitch LLP/Qualcomm

(57)     ABSTRACT

Method and apparatus for dynamic pre-equalization switching. The apparatus selects a pre-equalization type based on a pre-equalization criteria. The apparatus transmits a transmission to a second wireless device based on the pre-equalization type. The pre-equalization type is a first pre-equalization type, and the apparatus may switch from the first pre-equalization type to a second pre-equalization type based on a switch criteria. The apparatus may transmit a second transmission to the second wireless device based on the second pre-equalization type.

30 Claims, 12 Drawing Sheets

500

400

450

500

503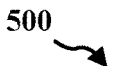

502
First wireless device

504
Second wireless device

506
Capability indication (e.g., support at least one equalization type)

508
Select a pre-equalization type based on a pre-equalization criteria

510
Monitor for a transmission based on a pre-equalization type

511

512
Transmission based on the pre-equalization type

514
Switch to a second pre-equalization type based on a switch criteria

Switch request ～ 520

Switch insturctions ～ 522

526
Switch instructions

524
Switch to a second pre-equalization type based on a switch criteria

516
Switch indication

517

518
Second transmission based on the second pre-equalization type

FIG. 5

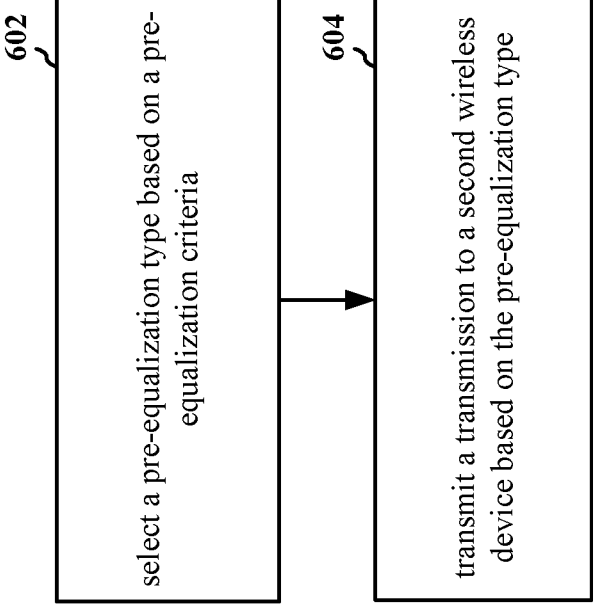
602
select a pre-equalization type based on a pre-equalization criteria
604
transmit a transmission to a second wireless device based on the pre-equalization type
600
FIG. 6

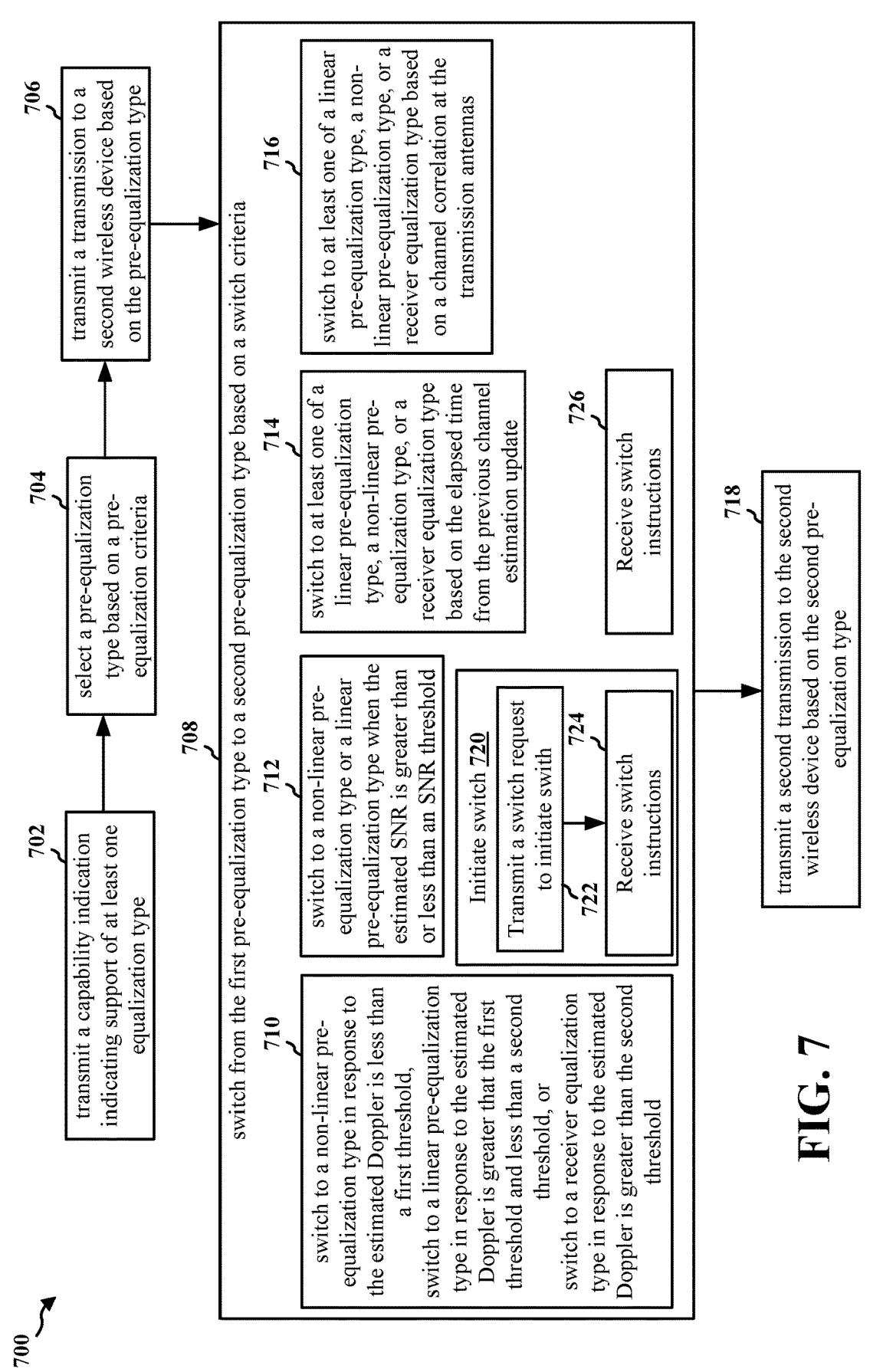

700

706 transmit a transmission to a second wireless device based on the pre-equalization type

704 select a pre-equalization type based on a pre-equalization criteria

702 transmit a capability indication indicating support of at least one equalization type

708 switch from the first pre-equalization type to a second pre-equalization type based on a switch criteria

716 switch to at least one of a linear pre-equalization type, a non-linear pre-equalization type, or a receiver equalization type based on a channel correlation at the transmission antennas

714 switch to at least one of a linear pre-equalization type, a non-linear pre-equalization type, or a receiver equalization type based on the elapsed time from the previous channel estimation update

726

Receive switch instructions

712 switch to a non-linear pre-equalization type or a linear pre-equalization type when the estimated SNR is greater than or less than an SNR threshold Initiate switch 720

Transmit a switch request to initiate switch

724

Receive switch instructions

722

Receive switch instructions

710 switch to a non-linear pre-equalization type in response to the estimated Doppler is less than a first threshold, switch to a linear pre-equalization type in response to the estimated Doppler is greater that the first threshold and less than a second threshold, or switch to a receiver equalization type in response to the estimated Doppler is greater than the second threshold

718 transmit a second transmission to the second wireless device based on the second pre-equalization type

FIG. 7

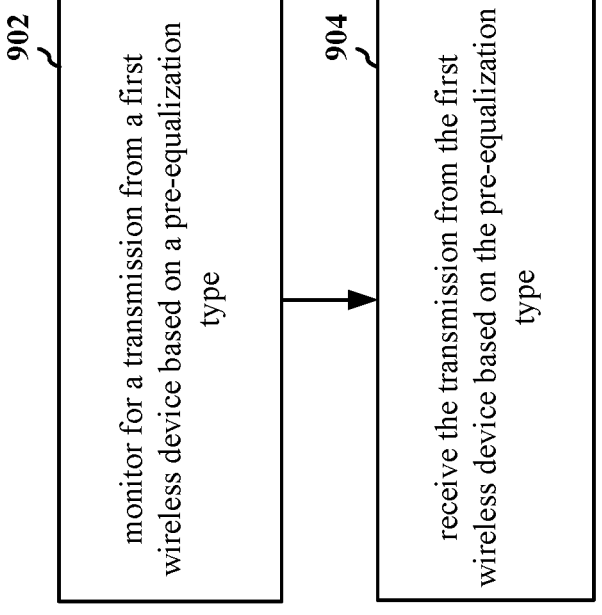
902
monitor for a transmission from a first wireless device based on a pre-equalization type
904
receive the transmission from the first wireless device based on the pre-equalization type
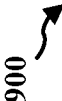
900
FIG. 9

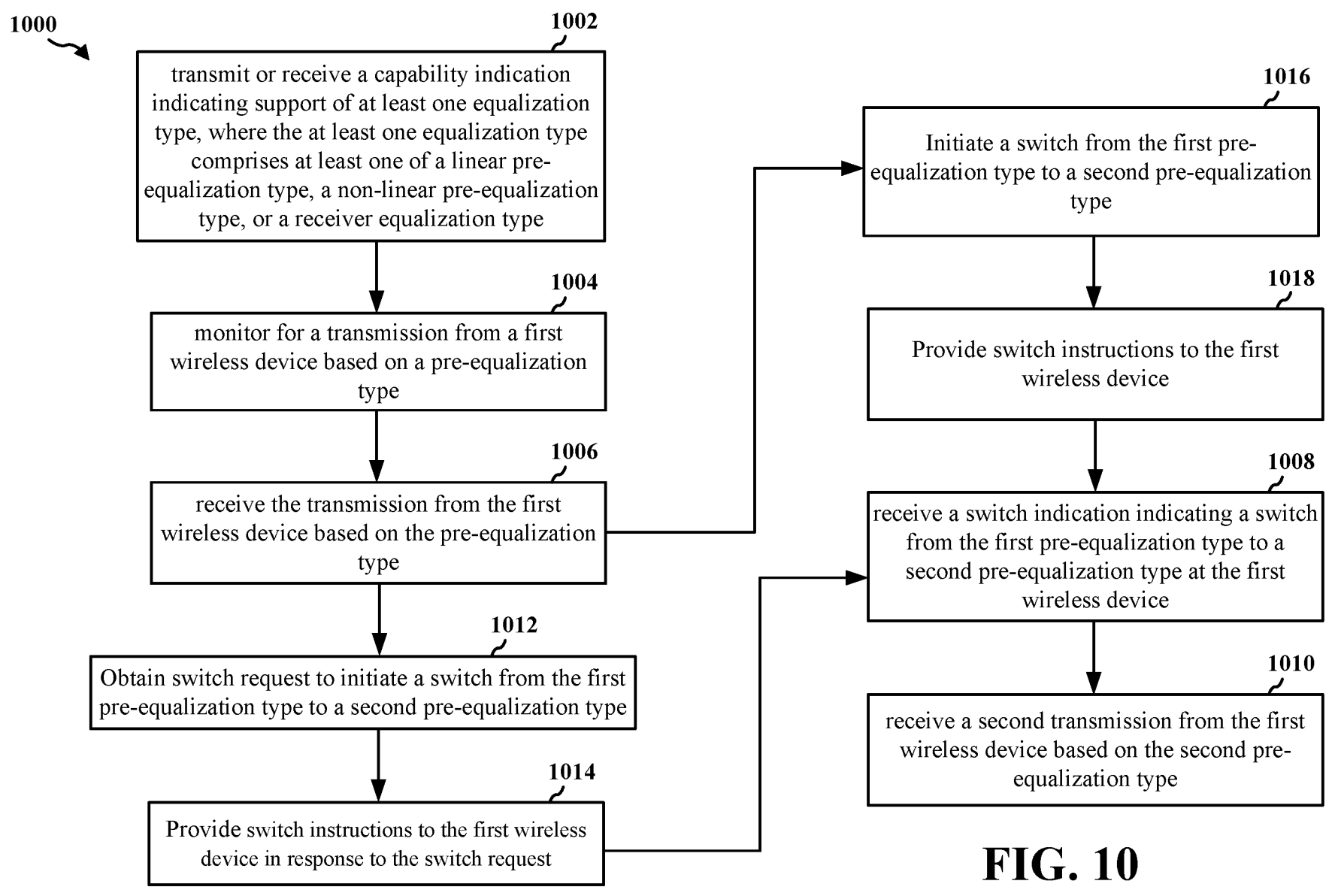

1000

1002
transmit or receive a capability indication indicating support of at least one equalization type, where the at least one equalization type comprises at least one of a linear pre-equalization type, a non-linear pre-equalization type, or a receiver equalization type

1004
monitor for a transmission from a first wireless device based on a pre-equalization type

1006
receive the transmission from the first wireless device based on the pre-equalization type

1012
Obtain switch request to initiate a switch from the first pre-equalization type to a second pre-equalization type

1014
Provide switch instructions to the first wireless device in response to the switch request

1016
Initiate a switch from the first pre-equalization type to a second pre-equalization type

1018
Provide switch instructions to the first wireless device

1008
receive a switch indication indicating a switch from the first pre-equalization type to a second pre-equalization type at the first wireless device

1010
receive a second transmission from the first wireless device based on the second pre-equalization type

FIG. 10

DYNAMIC PRE-EQUALIZATION SWITCHING FOR WIRELESS TRANSMISSIONS

TECHNICAL FIELD

The present disclosure relates generally to communication systems, and more particularly, to a configuration for wireless communication including pre-equalization.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device. The first wireless device may be a processor and/or a modem at a first wireless device or the first wireless device itself. The apparatus selects a pre-equalization type based on a pre-equalization criteria. The apparatus transmits a transmission to a second wireless device based on the pre-equalization type.

In an aspect of the disclosure, a method, a computer-readable medium, and an apparatus are provided. The apparatus may be a device at a second wireless device. The device may be a processor and/or a modem at a second wireless device or the second wireless device itself. The apparatus monitors for a transmission from a first wireless device based on a pre-equalization type. The apparatus receives the transmission from the first wireless device based on the pre-equalization type.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a call flow diagram of signaling between a first wireless device and a second wireless device.

FIG. 6 is a flowchart of a method of wireless communication.

FIG. 7 is a flowchart of a method of wireless communication.

FIG. 9 is a flowchart of a method of wireless communication.

FIG. 10 is a flowchart of a method of wireless communication.

DETAILED DESCRIPTION

Figure 1:
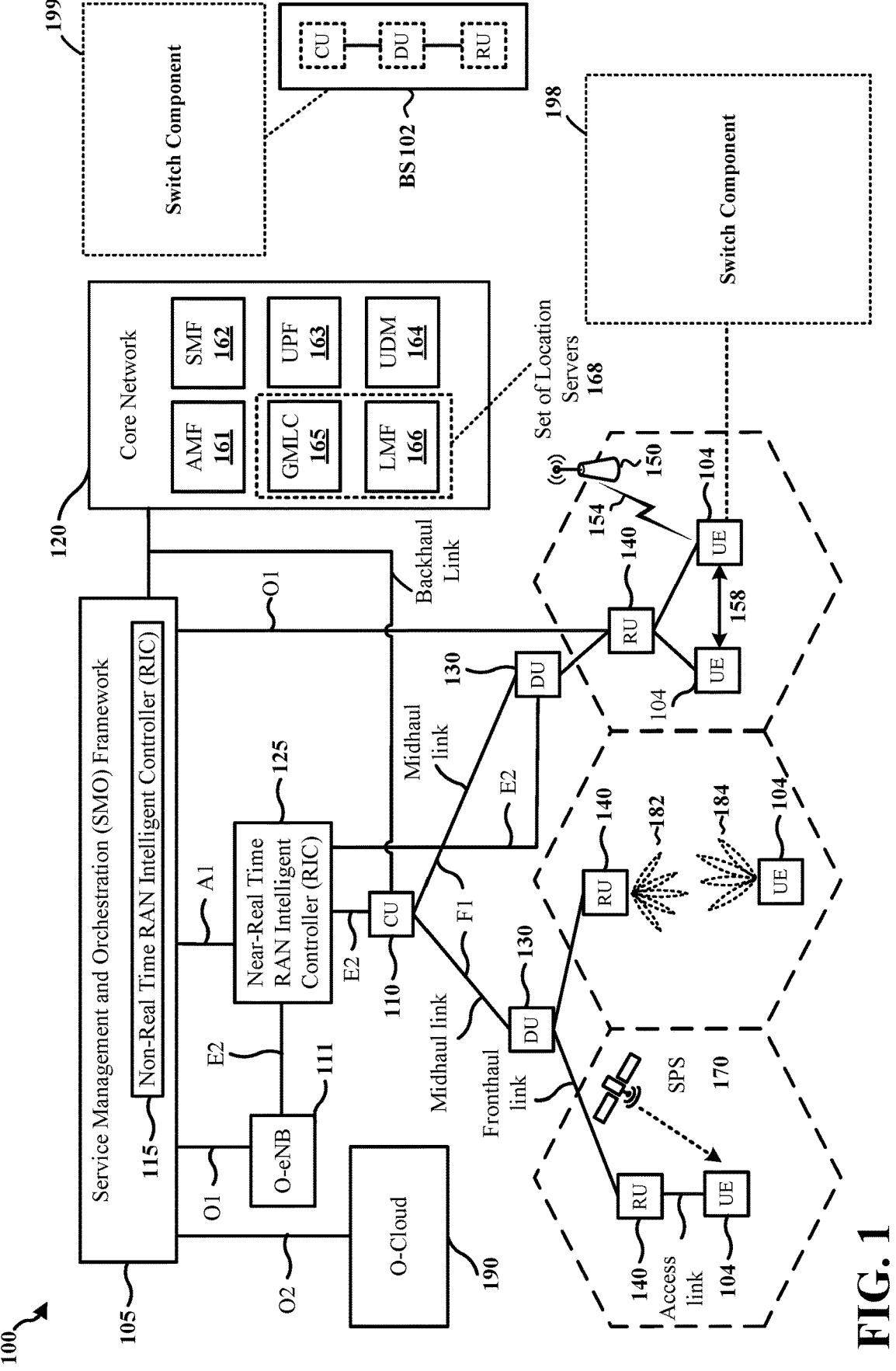
FIG. 1 is a diagram illustrating an example of a wireless communications system and an access network.

In wireless communications, there are multiple use cases for which pre-equalization may be utilized to enable a reduction in receiver complexity. For example, in ultra wideband (UWB), for XR applications a transmitting device may perform pre-equalization on XR transmissions to allow a device to receive the XR transmissions without equalization. The reduced complexity for reception of the XR transmission, e.g., without equalization at the receiver, enables receiver devices with lower power consumption, smaller size, and/or reduced weight, among other examples. In another example, in frequency range 3 (FR3), an FR3 receiver may support multiple multiple-input and multiple-output (MIMO) layers and pre-equalization may be utilized to reduce power consumption at the UE. Different types of pre-equalization may be used. Linear pre-equalization may have lower spectral efficiency in comparison to schemes involving both transmitter precoding and receiver equalization. Non-linear pre-equalization may have greater spectral efficiency than linear pre-equalization, yet may be more sensitive to channel aging. As another example, a receiver side equalization may provide improved performance and be more robust to mobility, yet may involve more complexity at the receiver side.

Aspects presented herein provide a configuration for dynamic pre-equalization switching based on one or more factors. For example, pre-equalization switching may dynamically occur between a non-linear pre-equalization, a linear pre-equalization, and/or a receiver equalization based on one or more factors such as estimated mobility or Doppler, estimated signal to noise ratio (SNR) or MCS, and/or an elapsed time from a last channel update, among other examples. The switching between pre-equalization types can optimize power consumption at the receiver while maintaining receiver performance under various conditions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a switch component 198 that may be configured to select a pre-equalization type based on a pre-equalization criteria; and transmit a transmission to a second wireless device based on the pre-equalization type.

Referring again to FIG. 1, in certain aspects, the base station 102 or the UE 104 may comprise a switch component 199 that may be configured to monitor for a transmission from a first wireless device based on a pre-equalization type; and receiving the transmission from the first wireless device based on the pre-equalization type.

Although the following description may be focused on 5G NR, the concepts described herein may be applicable to other similar areas, such as LTE, LTE-A, CDMA, GSM, and other wireless technologies.

Figures 2A, 2B, 2C, 2D:
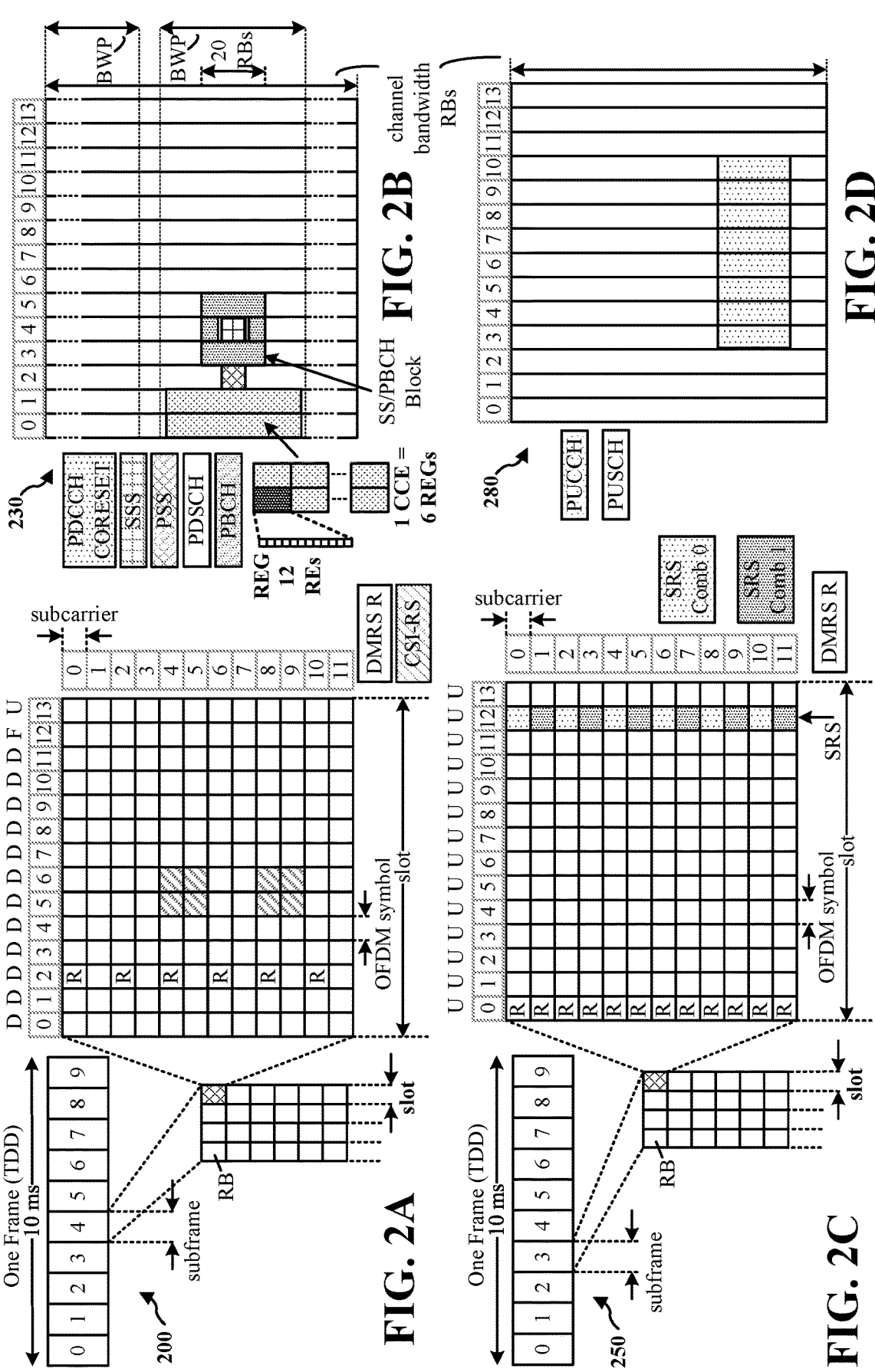
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15 [\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK)

feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
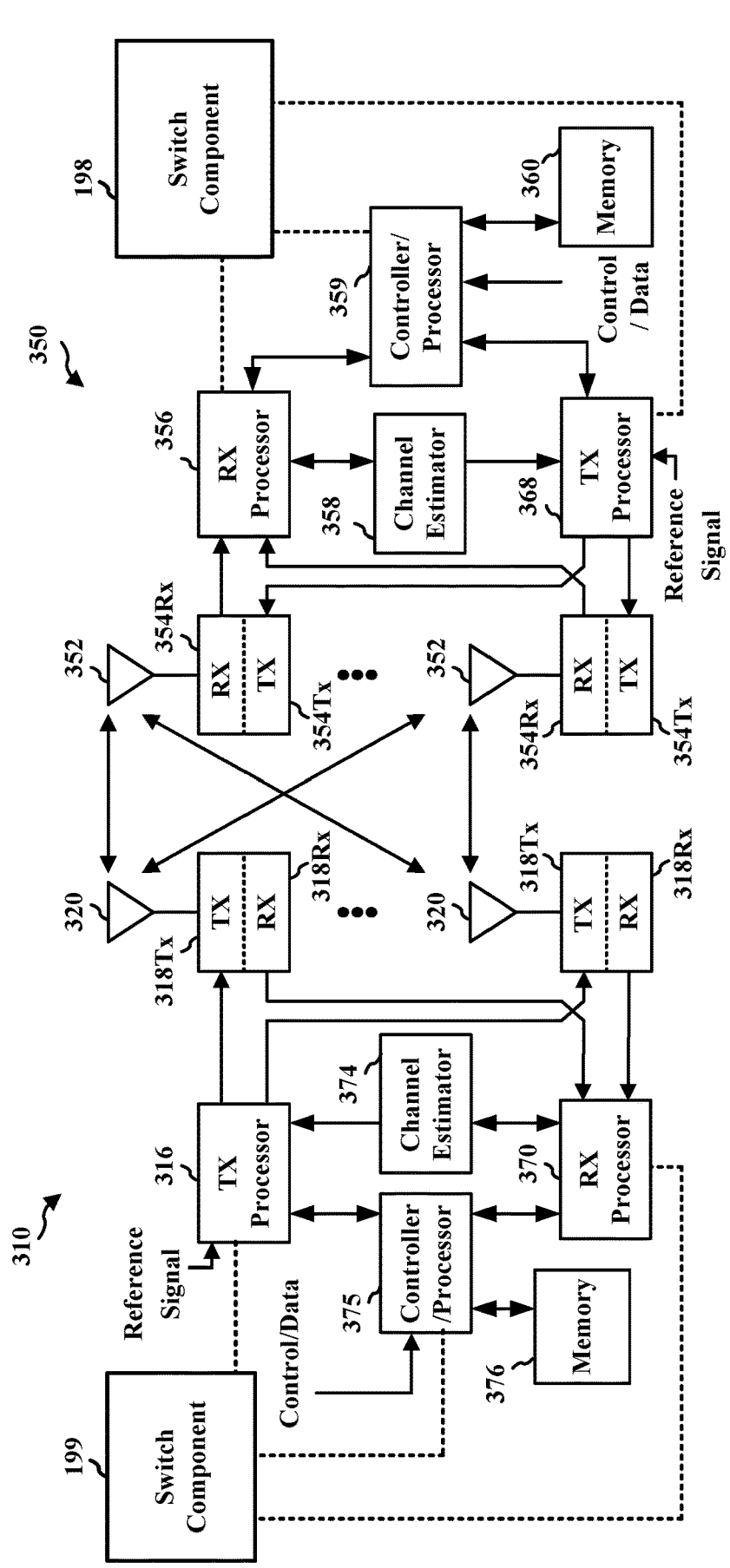
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data.

The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the switch component 198 of FIG. 1.

At least one of the TX processor 316, the RX processor 370, and the controller/processor 375 may be configured to perform aspects in connection with the switch component 199 of FIG. 1.

Wireless communication systems may support various types of wireless traffic. As one example of traffic that may be supported, XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 4B:
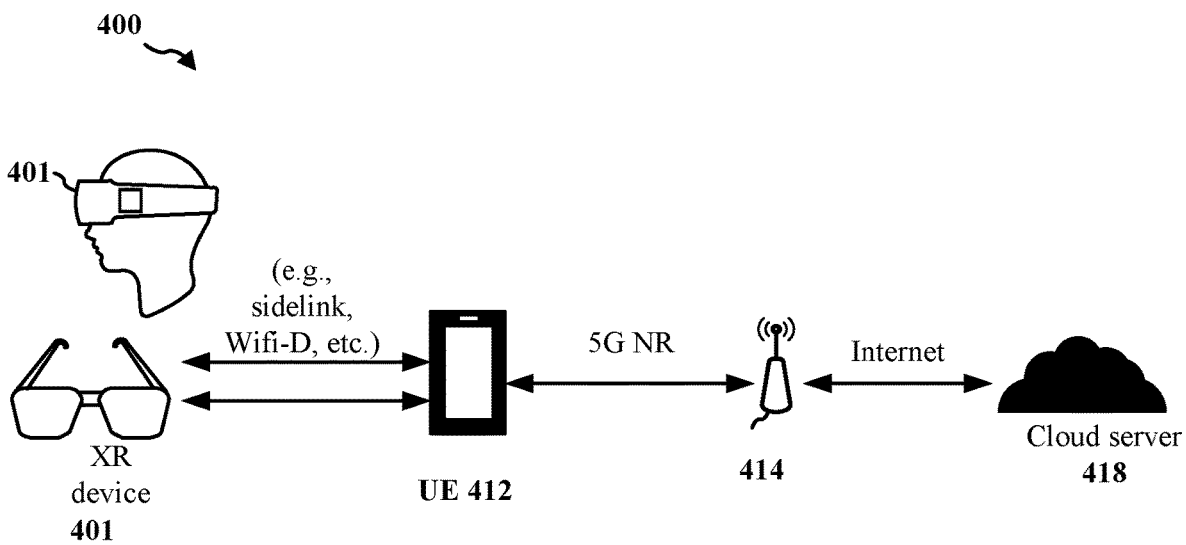
FIG. 4B is a diagram of wireless communications of XR devices.
Figure 4A:
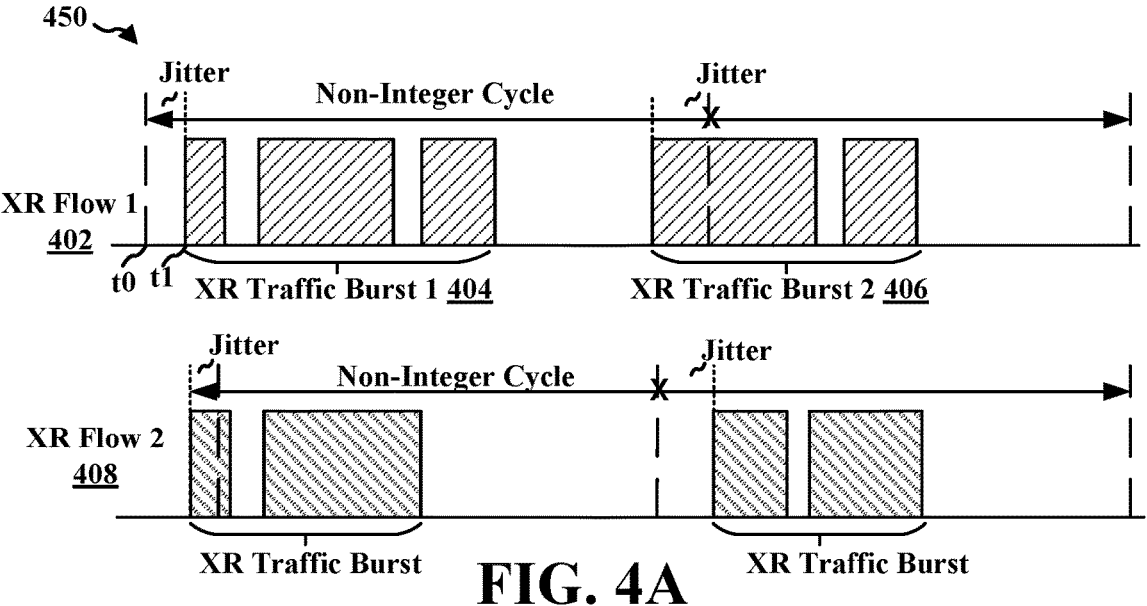
FIG. 4A is a diagram illustrating aspects of XR communication.

XR traffic may arrive in periodic traffic bursts ("XR traffic bursts"). An XR traffic burst may vary in a number of packets per burst and/or a size of each pack in the burst. FIG. 4A includes a diagram 450 illustrating a first XR flow 402 that includes a first XR traffic burst 404 and a second XR traffic burst 406. As illustrated in the diagram 450, the traffic bursts may include different numbers of packets, e.g., the first XR traffic burst 404 being shown with three packets (represented as rectangles in the diagram 450) and the second XR traffic burst 406 being shown with two packets. Furthermore, as illustrated in the diagram 450, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in 1/60=16.67 ms periods. In another example, for 120 FPS video data, XR traffic bursts may arrive in 1/120=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 450 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

The popularity of VR, AR, and MR technologies is growing at a fast pace and may be widely adopted for applications other than gaming, such as but not limited to healthcare, education, social, retail, and many more. There is an increase demand for XR devices 401 (e.g., XR goggles or headsets), as shown for example in diagram 400 of FIG. 4B, having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

Aspects presented herein enable a shift of at least a portion of the XR processing to a separate companion device. This approach may alleviate some of the burdens on the XR device. The approach offloads processing, such as rendering-related processing or equalization (e.g., which may be referred to as pre-equalization as it is performed prior to transmission to the XR device), to a companion device. The processing performed by the companion device can help to reduce the power consumption at the XR device while maintaining video quality or user experience, for example. FIG. 4B is a diagram 400 illustrating an example scenario for XR traffic in which an XR device (which may be, for example, augmented reality (AR) glasses or other types of XR devices) transmits and receives XR traffic with a service at a cloud server 418 via a wireless network that the XR device accesses via a companion device (e.g., UE 412). For example, the XR device transmits XR traffic to the UE, which in turn transmits the XR traffic to the network. XR traffic provided from the cloud server, e.g., such as video, graphics, or other XR traffic, are transmitted via the wireless network to the companion device (e.g., 402) that then transmits the XR traffic to the XR device 401. In FIG. 4B, at least some processing of the XR device 401 may be offloaded to various components connected with it, such as the UE 412 (which may be referred to as a companion device), base station 414, and/or a cloud server 418. For example, the UE 412 may perform pre-equalization on transmissions of XR traffic before providing the transmission to the XR device 401. This enables the XR device to receive the XR traffic without performing receiver side equalization.

In wireless communications, there are multiple use cases for which pre-equalization may be utilized to reduce receiver complexity. For example, in an ultra wideband (UWB), for a low complexity XR goggles-UE communication link for XR applications, XR traffic may be provided to XR goggles from a UE. In some aspects, the XR traffic may be exchanged between the XR goggles and the network via the UE. The UE may perform pre-equalization on the XR traffic from the network before transmitting the XR traffic to the XR goggles to allow the XR goggles to receive the XR traffic without equalization at the power limited XR goggles. In another example, in frequency range 3 (FR3), an FR3 receiver that may support multiple MIMO layers (e.g., 8 MIMO layers), UE equalization of the multiple layers may utilize a high amount of power, and pre-equalization may be used to maintain reasonable power consumption on the UE side.

There may be different types of pre-equalization. As one example, linear pre-equalization may be used. In some aspects, the linear pre-equalization may have a lower spectral efficiency in comparison to schemes involving both transmitter precoding and receiver equalization. To compensate for this loss, non-linear pre-equalization schemes, such as for example, Tomlinson Harashima precoding or the like, may be used. In some aspects, non-linear pre-equalization may be referred to as non-linear dirty paper coding schemes. Non-linear pre-equalization may be more sensitive to mobility and channel aging. For example, both linear and non-linear pre-equalization may be sensitive to channel aging. Receiver side equalization may provide improved performance and be more robust to mobility, yet involves more receiver side complexity and power consumption.

Aspects presented herein provide a configuration dynamic pre-equalization switching, e.g., switching between different types of pre-equalization based on one or more factors. For example, pre-equalization switching may dynamically occur between a non-linear pre-equalization, a linear pre-equalization, and/or a receiver equalization, among other potential examples. The non-linear equalization may be comparable to receiver equalization, the linear pre-equalization may be more robust than the non-linear pre-equalization, and the receiver equalization being more robust than non-linear pre-equalization or linear pre-equalization. At least one advantage of the disclosure is that the dynamic switching between the different pre-equalization techniques may optimize power consumption while maintaining receiver performance.

In some aspects, dynamic switching between the different pre-equalization techniques may be based on one or more factors, such as but not limited to, an estimated mobility, an estimated Doppler, an estimated SNR, a MCS used, or an elapsed time from a previous channel estimation update at the transmitter side for pre-equalization purposes. In some aspects, a first wireless device (e.g., UE or XR device) may signal its capability to support the different pre-equalization techniques. For example, the first wireless device may indicate support for a receiver equalization, a linear pre-equalization, or a non-linear pre-equalization. Although three techniques are described herein, the disclosure is not intended to be limited to the aspects disclosed herein. In some aspects, the first wireless device may be configured to support one or more techniques and is not intended to be limited to three techniques. The receiver equalization may be a standard approach or technique, where equalization is performed at the receiver. The linear pre-equalization may be performed at the transmitter (e.g., first wireless device) and may utilize feedback of the channel estimation. The non-linear pre-equalization may be performed at the transmitter and may utilize feedback of the channel estimation and some processing at the receiver side (e.g., second wireless device). In some aspects, the first wireless device may indicate support of linear pre-equalization and non-linear pre-equalization separately as support of one may not implicitly indicate support of the other. In some aspects, the first wireless device may indicate that the capability may be based on channel conditions (e.g., low enough mobility (Doppler), or a specific SNR range).

In some aspects, the dynamic switching may be based on the estimated Doppler. For example, the first wireless device may select one of the equalization techniques based on the estimated Doppler. The first wireless device may select one of the equalization techniques based on the estimated Doppler in comparison to threshold measurements. For example, if the Doppler is less than a first threshold, then the non-linear pre-equalization may be selected, or if the Doppler is less than less than a second threshold but greater than the first threshold, then the linear pre-equalization may be selected. If the Doppler is greater than the second threshold, then the receiver equalization may be selected. In some aspects, the estimated Doppler and related decision may occur at either on the first wireless device (e.g., UE) or second wireless device (e.g., network entity) for FR3 case. In some aspects, for example in XR, the Doppler estimation and related decision may occur on the UE side. The wireless device determining the Doppler estimation may signal the selection to the other side. The selection of the equalization may be signaled via DCI, MAC-CE, RRC, or UCI.

In some aspects, the dynamic switching may be based on an estimated SNR or the MCS utilized. For example, the first wireless device may select one of the linear pre-equalization or the non-linear pre-equalization based on the estimated SNR or the MCS. In some aspects, the estimated SNR and related decision may be performed at either on the first wireless device (e.g., UE) or the second wireless device (e.g., network entity) for FR3 instances. In some aspects, for example XR, the SNR estimation and decision may be performed at the UE side. The wireless device determining the estimated SNR or MCS may indicate its selection to the other side. The selection of the equalization may be signaled via DCI, MAC-CE, RRC, or UCI. In some aspects, the selection of the equalization may be signaled implicitly by the used MCS. In such aspects, the second wireless device (e.g., network entity) may signal in an RRC message the association between the MCS and the selected equalization scheme. The association may be per waveform type, such as OFDM and DFT-S-OFDM, which may have experience different behaviors. In some aspects, the selection may be made based on a combined criteria of SNR and Doppler.

In some aspects, the dynamic switching may be based on an elapsed time from a previous channel estimation update. The resulting post processing SNR (e.g., post minimum means squared error (MMSE) equalizer SNR) may indicate an improvement of performance with every refresh of the channels estimation, while the channel estimation may deteriorate as more time elapses from the last or prior update. As such, the selection of the equalization scheme may be based on the elapsed time. In some aspects, the selection may be signaled via RRC indicating the elapsed time threshold from which a new scheme (e.g. receiver equalization) should be used. In some aspects, this selection may be signaled dynamically in DCI or MAC-CE. This criteria may be used together with either the Doppler and/or SNR, and the selection of the scheme may be based on a combination of all three (e.g., estimated Doppler, estimated SNR/MCS, elapsed time from last channel estimation update).

In some aspects, the dynamic switching may be based on a transmission rank/antennas. In some aspects, the channel correlation loss over time may comprise a significant difference between different component of the channel estimation matrix, which may result from polarization imbalance or other channel conditions. As a result, the correlation may be measured per antenna and the resulting equalization scheme may be selected based on a used rank and selected antennas, which may be more suitable for UWB allocation with small (e.g., 2×2) MIMO configurations.

FIG. 5 is a call flow diagram 500 of signaling between a first wireless device 502 and a second wireless device 504. The first wireless device 502 may be configured to communicate with the second wireless device 504. In some aspects, the first wireless device 502 may be a base station (or a component of a base station), and the second wireless device 504 may be a UE. In another example, the second device 504 may correspond to an XR device that receives XR traffic (e.g., 511, 517) from the network (e.g., a base station 503) via the first wireless device 502 (e.g., which may be a UE). For example, in the context of FIG. 1, the first wireless device 502 may correspond to base station 102 (or a component of a base station) and/or the UE 104 and the second wireless device 504 may correspond to at least UE 104. In another example, in the context of FIG. 3, the first wireless device 502 may correspond to base station 310 and the second wireless device 504 may correspond to UE 350.

At 506, the first wireless device 502 may transmit a capability indication to the second wireless device 504. The second wireless device 502 may receive the capability indication from the first wireless device 502. In some aspects, the second wireless device 504 may also transmit a capability indication to the first wireless device 502. The capability indication may indicate support for at least one equalization type. The at least one equalization type may comprise at least one of a linear pre-equalization type, a non-linear pre-equalization type, or a receiver equalization type.

At 508, the first wireless device 502 may select a pre-equalization type based on a pre-equalization criteria. For example, pre-equalization may be utilized to maintain or optimize power consumption at the first wireless device while maintaining good receiver performance.

At 510, the second wireless device 504 device may monitor for a transmission from the first wireless device 502. The second wireless device may monitor for the transmission from the first wireless device based on a pre-equalization type.

At 512, the first wireless device 502 may transmit a transmission to the second wireless device 504 based on the pre-equalization type. The second wireless device 504 may receive the transmission based on the pre-equalization type from the first wireless device 502. In the example in which the second wireless device 504 is an XR device that receives XR traffic from the base station 503.

At 514, the first wireless device 502 may switch to a second pre-equalization type based on a switch criteria. In some aspects, the pre-equalization type may comprise a first pre-equalization type, such that the first wireless device may switch from the first pre-equalization type to the second pre-equalization type based on the switch criteria. In some aspects, switching to the second pre-equalization type may include switching between a linear pre-equalization and a non-linear pre-equalization at the first wireless device. In some aspects, switching to the second pre-equalization type may include switching between a linear pre-equalization at the first wireless device and a receiver equalization type. In some aspects, switching to the second pre-equalization type may include switching between a non-linear pre-equalization and a receiver equalization type at the first wireless device. In some aspects, the switch criteria may be based on at least one of an estimated Doppler, an estimated signal to noise ratio (SNR), or an elapsed time from a previous channel estimation update. In some aspects, the first wireless device 502 may be configured to initiate the switch. For example, the first wireless device may estimate at least one of Doppler, SNR, or rank and based on such estimations may initiate the switch. The first wireless device, at 520, may transmit a switch request to the second wireless device 504. The second wireless device 504 may obtain the switch request from the first wireless device 502. The switch request may comprise a request for switching pre-equalization type based at least on an estimation of the Doppler, SNR, or rank. The second wireless device 504 may determine whether to provide instructions to switch based on the estimation of at least one of the Doppler, SNR, or rank. The second wireless device 504, at 522, may provide switch instructions to the first wireless device 502 in response to the switch request. The first wireless device 502 may receive the switch instructions from the second wireless device 504. The switch instructions may comprise instructions to switch between the first pre-equalization type and the second pre-equalization type.

In some aspects, the second wireless device 504 may be configured to initiate the switch. For example, the second wireless device 504 may be configured to estimate at least one of the Doppler, SNR, or rank based on at least a prior reception (e.g., bi-directional communication) from the first wireless device 502. The second wireless device 504, at 524, may initiate the switch based on the estimation of at least one of the Doppler, SNR, or rank. The second wireless device 504 may determine whether to provide instructions to switch based on the estimation of at least one of the Doppler, SNR, or rank. The second wireless device 504, at 526, may transmit switch instructions to the first wireless device 502 based on the estimation of at least one of the Doppler, SNR, or rank. The first wireless device may receive the switch instructions from the second wireless device 504. The switch instructions may comprise instructions to switch between the first pre-equalization type and the second pre-equalization type.

In instances where the switch criteria is based on the estimated Doppler, switching to the second pre-equalization type may comprise at least one of switching to a non-linear pre-equalization type in response to the estimated Doppler is less than a first threshold, switching to a linear pre-equalization type in response to the estimated Doppler is greater that the first threshold and less than a second threshold, or switching to a receiver equalization type in response to the estimated Doppler is greater than the second threshold. In instances where the switch criteria is based on the estimated SNR, switching to the second pre-equalization type may comprise switching to a non-linear pre-equalization type or a linear pre-equalization type when the estimated SNR is greater than or less than an SNR threshold. In instances where the switch criteria is based on the elapsed time from the previous channel estimation update, switching to the second pre-equalization type may comprise switching to at least one of a linear pre-equalization type, a non-linear pre-equalization type, or a receiver equalization type based on the elapsed time from the previous channel estimation update. In some aspects, the switch criteria may be based at least one transmission antennas, such that switching to the second pre-equalization type may comprise switching to at least one of a linear pre-equalization type, a non-linear pre-equalization type, or a receiver equalization type based on a channel correlation at the transmission antennas. The switch criteria may be based at least on a combination of one or more of the transmission antennas, the estimated Doppler, the estimated SNR, or the elapsed time from the previous channel estimation update. In some aspects, a selection of the second pre-equalization type may be indicated by at least one of downlink control information (DCI), media access control (MAC) control element (CE) (MAC-CE), or radio resource control (RRC) signaling.

At 516, the first wireless device 502 may transmit a switch indication to the second wireless device 504. The second wireless device may receive the switch indication from the first wireless device. The switch indication may indicate a switch from the first pre-equalization type to the second pre-equalization type at the first wireless device. In some aspects, the switch may be between two of a linear pre-equalization type, a non-linear pre-equalization type, and a receiver equalization type. In some aspects, the switch indication may be comprised in at least one of DCI, MAC-CE, or RRC signaling that indicates the second pre-equalization type.

At 518, the first wireless device 502 may transmit a second transmission to the second wireless device 504 based on the second pre-equalization type. The second wireless device 504 may receive the second transmission based on the second pre-equalization type from the first wireless device 502.

FIG. 6 is a flowchart 600 of a method of wireless communication at a first wireless device. The method may be performed by a UE (e.g., the UE 104; the apparatus 804) or a network node such as a base station or one or more components of a base station (e.g. 102, 310, or the network entity 1202). One or more of the illustrated operations may be omitted, transposed, or contemporaneous. The method may enable a transmitter to between multiple pre-equalization types based on one or more factors in order to balance power consumption and receiver performance under variable conditions.

At 602, the first wireless device may select a pre-equalization type. For example, 602 may be performed by switch component 198 of apparatus 804 or the network entity 1202. The first wireless device may select the pre-equalization type based on a pre-equalization criteria. For example, pre-equalization may be utilized to maintain or optimize power consumption at the first wireless device while maintaining good receiver performance.

At 604, the first wireless device may transmit a transmission to a second wireless device. For example, 604 may be performed by switch component 198 of apparatus 804 or the network entity 1202. The first wireless device may transmit the transmission to the second wireless device based on the pre-equalization type.

FIG. 7 is a flowchart 700 of a method of wireless communication at a first wireless device. The method may be performed by a UE (e.g., the UE 104; the apparatus 804) or a network node such as a base station or one or more components of a base station (e.g., base station 102, 310, or the network entity 1202). One or more of the illustrated operations may be omitted, transposed, or contemporaneous. The method may enable a transmitter to between multiple pre-equalization types based on one or more factors in order to balance power consumption and receiver performance under variable conditions.

At 702, the first wireless device may transmit a capability indication. For example, 702 may be performed by switch component 198 of apparatus 804 or the network entity 1202. The first wireless device may transmit the capability indication to a second wireless device. The capability indication may indicate support for at least one equalization type. The at least one equalization type may comprise at least one of a linear pre-equalization type, a non-linear pre-equalization type, or a receiver equalization type.

At 704, the first wireless device may select a pre-equalization type. For example, 704 may be performed by switch component 198 of apparatus 804 or the network entity 1202. The first wireless device may select the pre-equalization type based on a pre-equalization criteria. For example, pre-equalization may be utilized to maintain or optimize power consumption at the first wireless device while maintaining good receiver performance.

At 706, the first wireless device may transmit a transmission to a second wireless device. For example, 706 may be performed by switch component 198 of apparatus 804 or the network entity 1202. The first wireless device may transmit the transmission to the second wireless device based on the pre-equalization type.

At 708, the pre-equalization type may comprise a first pre-equalization type, such that the first wireless device may switch from the first pre-equalization type to a second pre-equalization type based on a switch criteria. For example, 708 may be performed by switch component 198 of apparatus 804 or the network entity 1202. In some aspects, switching to the second pre-equalization type may include switching between a linear pre-equalization and a non-linear pre-equalization at the first wireless device. In some aspects, switching to the second pre-equalization type may include switching between a linear pre-equalization at the first wireless device and a receiver equalization type. In some aspects, switching to the second pre-equalization type may include switching between a non-linear pre-equalization and a receiver equalization type at the first wireless device. In some aspects, the switch criteria may be based on at least one of an estimated Doppler, an estimated signal to noise ratio (SNR), or an elapsed time from a previous channel estimation update. In instances where the switch criteria is based on the estimated Doppler, for example at 710, switching to the second pre-equalization type may comprise at least one of switching to a non-linear pre-equalization type in response to the estimated Doppler is less than a first threshold, switching to a linear pre-equalization type in response to the estimated Doppler is greater that the first threshold and less than a second threshold, or switching to a receiver equalization type in response to the estimated Doppler is greater than the second threshold. In instances where the switch criteria is based on the estimated SNR, for example at 712, switching to the second pre-equalization type may comprise switching to a non-linear pre-equalization type or a linear pre-equalization type when the estimated SNR is greater than or less than an SNR threshold. In instances where the switch criteria is based on the elapsed time from the previous channel estimation update, for example at 714, switching to the second pre-equalization type may comprise switching to at least one of a linear pre-equalization type, a non-linear pre-equalization type, or a receiver equalization type based on the elapsed time from the previous channel estimation update. In some aspects, the switch criteria may be based at least one transmission antennas, for example at 716, such that switching to the second pre-equalization type may comprise switching to at least one of a linear pre-equalization type, a non-linear pre-equalization type, or a receiver equalization type based on a channel correlation at the transmission antennas. The switch criteria may be based at least on a combination of one or more of the transmission antennas, the estimated Doppler, the estimated SNR, or the elapsed time from the previous channel estimation update. In some aspects, a selection of the second pre-equalization type may be indicated by at least one of DCI, MAC-CE, or RRC signaling. In some aspects, at 720, the first wireless device may initiate the switch from the first pre-equalization type to the second pre-equalization type. The first wireless device may be configured to estimate at least one of Doppler, SNR, or rank and based on such estimations may initiate the switch. For example, at 722, the first wireless device may transmit a switch request to the second wireless device. The switch request may comprise a request for switching pre-equalization type based at least on an estimation of the Doppler, SNR, or rank. The first wireless device, at 724, may receive switch instructions from the second wireless device 504, where the switch instructions comprise instructions to switch between the first pre-equalization type and the second pre-equalization type based on the switch request. In some aspects, the switch may be initiated by the second wireless device. For example, the second wireless device may be configured to estimate at least one of the Doppler, SNR, or rank based on at least a prior reception (e.g., bi-directional communication) from the first wireless device. The second wireless device may initiate the switch based on the estimation of at least one of the Doppler, SNR, or rank. The second wireless device may determine whether to provide instructions to switch based on the estimation of at least one of the Doppler, SNR, or rank. The first wireless device, at 726, may receive switch instructions from the second wireless device based on the estimation of at least one of the Doppler, SNR, or rank by the second wireless device. The switch instructions may comprise instructions to switch between the first pre-equalization type and the second pre-equalization type.

At 718, the first wireless device may transmit a second transmission to the second wireless device. For example, 718 may be performed by switch component 198 of apparatus 804 or the network entity 1202. The first wireless device may transmit the second transmission to the second wireless device based on the second pre-equalization type.

Figure 8:
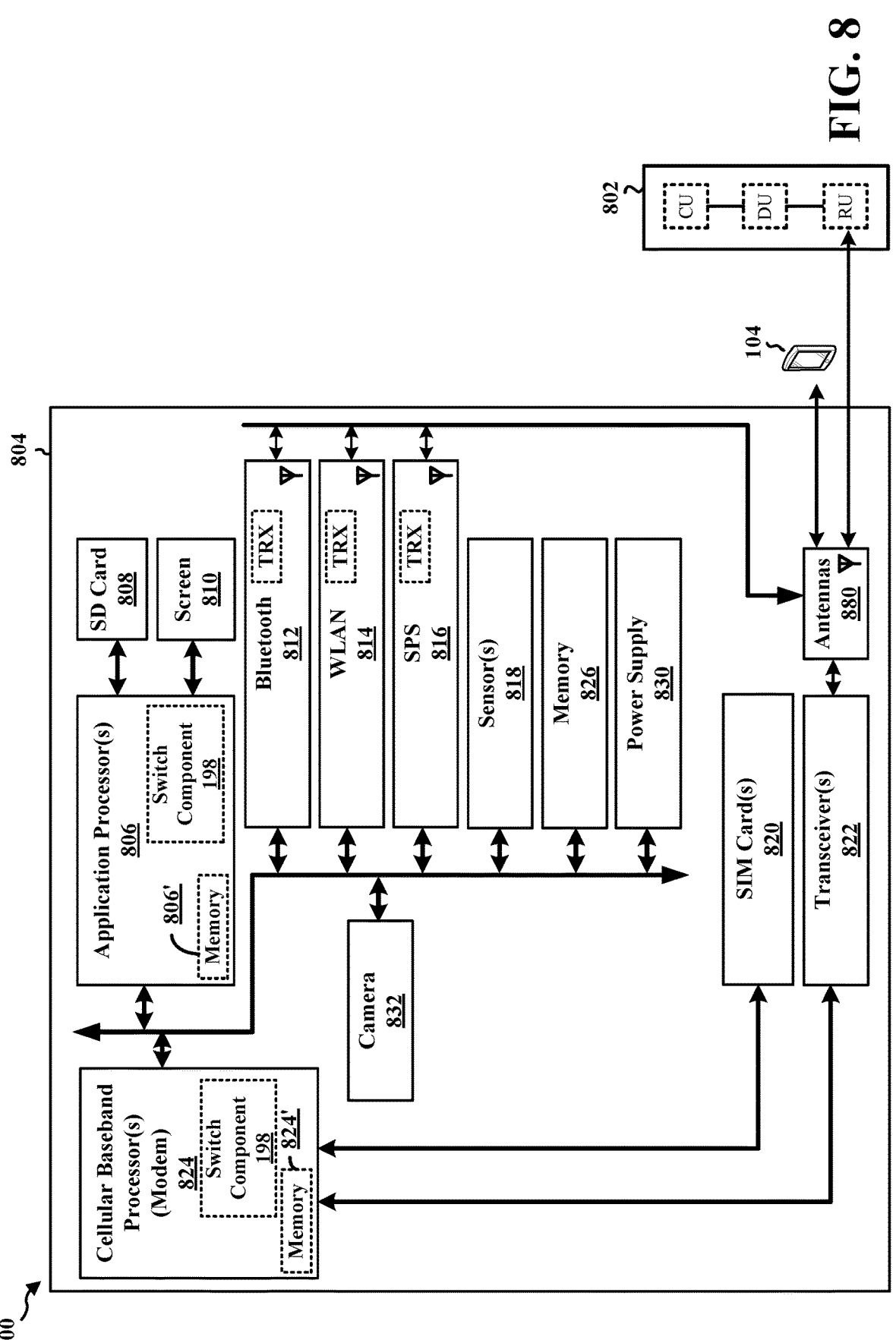
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include at least one cellular baseband processor 824 (also referred to as a modem) coupled to one or more transceivers 822 (e.g., cellular RF transceiver). The cellular baseband processor(s) 824 may include at least one on-chip memory 824'. In some aspects, the apparatus 804 may further include one or more subscriber identity modules (SIM) cards 820 and at least one application processor 806 coupled to a secure digital (SD) card 808 and a screen 810. The application processor(s) 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor(s) 824 communicates through the transceiver(s) 822 via one or more antennas 880 with the UE 104 and/or with an RU associated with a network entity 802. The cellular baseband processor(s) 824 and the application processor(s) 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor(s) 824 and the application processor(s) 806 are each responsible for general processing, including the execution of software stored on the computer-readable medium/memory. The software, when executed by the cellular baseband processor(s) 824/application processor(s) 806, causes the cellular baseband processor(s) 824/application processor(s) 806 to perform the various functions described supra. The cellular baseband processor(s) 824 and the application processor(s) 1006 are configured to perform the various functions described supra based at least in part of the information stored in the memory. That is, the cellular baseband processor(s) 824 and the application processor(s) 806 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 824/application processor(s) 806 when executing software. The cellular baseband processor(s) 824/application processor(s) 806 may be a component of the UE 350 and may include the at least one memory 360 and/or at least one of the TX processor 368, the RX processor 356, and the controller/processor 359. In one configuration, the apparatus 804 may be at least one processor chip (modem and/or application) and include just the cellular baseband processor(s) 824 and/or the application processor(s) 806, and in another configuration, the apparatus 804 may be the entire UE (e.g., see UE 350 of FIG. 3) and include the additional modules of the apparatus 804.

As discussed supra, the component 198 may be configured to select a pre-equalization type based on a pre-equalization criteria; and transmit a transmission to a second wireless device based on the pre-equalization type. The component 198 may be within the cellular baseband processor(s) 824, the application processor(s) 806, or both the cellular baseband processor(s) 824 and the application processor(s) 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 804 may include a variety of components configured for various functions. In one configuration, the apparatus 804, and in particular the cellular baseband processor(s) 824 and/or the application processor(s) 806, may include means for selecting a pre-equalization type based on a pre-equalization criteria. The apparatus includes means for transmitting a transmission to a second wireless device based on the pre-equalization type. The apparatus further includes means for switching from the first pre-equalization type to a second pre-equalization type based on a switch criteria. The apparatus further includes means for transmitting a second transmission to the second wireless device based on the second pre-equalization type. The apparatus further includes means for transmitting a switch request to initiate the switch based at least on an estimation of at least one of Doppler, SNR, or rank. The apparatus further includes means for receiving switch instructions to perform the switch to the second pre-equalization type based on the switch request. The apparatus further includes means for receiving switch instructions to perform the switch to the second pre-equalization type based on an estimation of at least one of Doppler, SNR. The apparatus further includes means for transmitting a capability indication indicating support of at least one equalization type. The apparatus further includes means for switching to a non-linear pre-equalization type in response to the estimated Doppler is less than a first threshold. The apparatus further includes means for switching to a linear pre-equalization type in response to the estimated Doppler is greater that the first threshold and less than a second threshold. The apparatus further includes means for switching to a receiver equalization type in response to the estimated Doppler is greater than the second threshold. The apparatus further includes means for switching to a non-linear pre-equalization type or a linear pre-equalization type when the estimated SNR is greater than or less than an SNR threshold. The apparatus further includes means for switching to at least one of a linear pre-equalization type, a non-linear pre-equalization type, or a receiver equalization type based on the elapsed time from the previous channel estimation update. The apparatus further includes means for switching to at least one of a linear pre-equalization type, a non-linear pre-equalization type, or a receiver equalization type based on a channel correlation at the transmission antennas. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 9 is a flowchart 900 of a method of wireless communication at a second wireless device. The method may be performed by a UE (e.g., the UE 104; the apparatus 1104) or may be performed by an XR device (e.g., 401; the apparatus 1104). One or more of the illustrated operations may be omitted, transposed, or contemporaneous. The method may balance power consumption and receiver performance under variable conditions by receiving communication based on pre-equalization that is selected based on one or more factors.

At 902, the second wireless device may monitor for a transmission from a first wireless device. For example, 902 may be performed by switch component 199 of apparatus 1104. The second wireless device may monitor for the transmission from the first wireless device based on a pre-equalization type.

At 904, the second wireless device may receive the transmission from the first wireless device. For example, 904 may be performed by switch component 199 of apparatus 1104. The second wireless device may receive the transmission from the first wireless device based on the pre-equalization type.

FIG. 10 is a flowchart 1000 of a method of wireless communication at a second wireless device. The method may be performed by a UE (e.g., the UE 104; the apparatus 1104) or may be performed by an XR device (e.g., 401; the apparatus 1102). One or more of the illustrated operations may be omitted, transposed, or contemporaneous. The method may balance power consumption and receiver performance under variable conditions by receiving communication based on pre-equalization that is selected based on one or more factors.

At 1002, the second wireless device may transmit or receive a capability indication. For example, 1002 may be performed by switch component 199 of apparatus 1104. The second wireless device may transmit or receive the capability indication to or from the first wireless device. The capability indication may indicate support of at least one equalization type. The at least one equalization type may comprise at least one of a linear pre-equalization type, a non-linear pre-equalization type, or a receiver equalization type.

At 1004, the second wireless device may monitor for a transmission from a first wireless device. For example, 1004 may be performed by switch component 199 of apparatus 1104. The second wireless device may monitor for the transmission from the first wireless device based on a pre-equalization type.

At 1006, the second wireless device may receive the transmission from the first wireless device. For example, 1006 may be performed by switch component 199 of apparatus 1104. The second wireless device may receive the transmission from the first wireless device based on the pre-equalization type.

In some aspects, the switch from the first pre-equalization type to the second pre-equalization type is initiated by the first wireless device. In such instances, at 1012, the second wireless device may obtain a switch request to initiate the switch. The second wireless device may obtain the switch request to initiate the switch from the first wireless device. The switch request may comprise a request for switching pre-equalization type based at least on an estimation of the Doppler, SNR, or rank. The second wireless device may determine whether to provide instructions to switch based on the estimation of at least one of the Doppler, SNR, or rank. The second wireless device, at 1014, may provide switch instructions to the first wireless device in response to the switch request.

In some aspects, the switch request from the first pre-equalization type to the second pre-equalization type may be initiated by the second wireless device. In such instances, for example at 1016, the second wireless device may initiate the switch based on the estimation of at least one of the Doppler, SNR, or rank. The second wireless device 504 may be configured to estimate at least one of the Doppler, SNR, or rank based on at least a prior reception (e.g., bi-directional communication) from the first wireless device. The second wireless device may determine whether to provide instructions to switch based on the estimation of at least one of the Doppler, SNR, or rank. The second wireless device, at 1018, may transmit switch instructions to the first wireless device based on the estimation of at least one of the Doppler, SNR, or rank.

At 1008, the pre-equalization type may comprise a first pre-equalization type, such that the second wireless device may receive a switch indication indicating a switch from the first pre-equalization type to a second pre-equalization type at the first wireless device. For example, 1008 may be performed by switch component 199 of apparatus 1104. The second wireless device may receive the switch indication from the first wireless device. In some aspects, the switch may be between two of a linear pre-equalization type, a non-linear pre-equalization type, and a receiver equalization type. In some aspects, the switch indication may be comprised in at least one of DCI, MAC-CE, or RRC signaling that indicates the second pre-equalization type.

At 1010, the second wireless device may receive a second transmission from the first wireless device. For example, 1010 may be performed by switch component 199 of apparatus 1104. The second wireless device may receive the second transmission from the first wireless device based on the second pre-equalization type.

Figure 11:
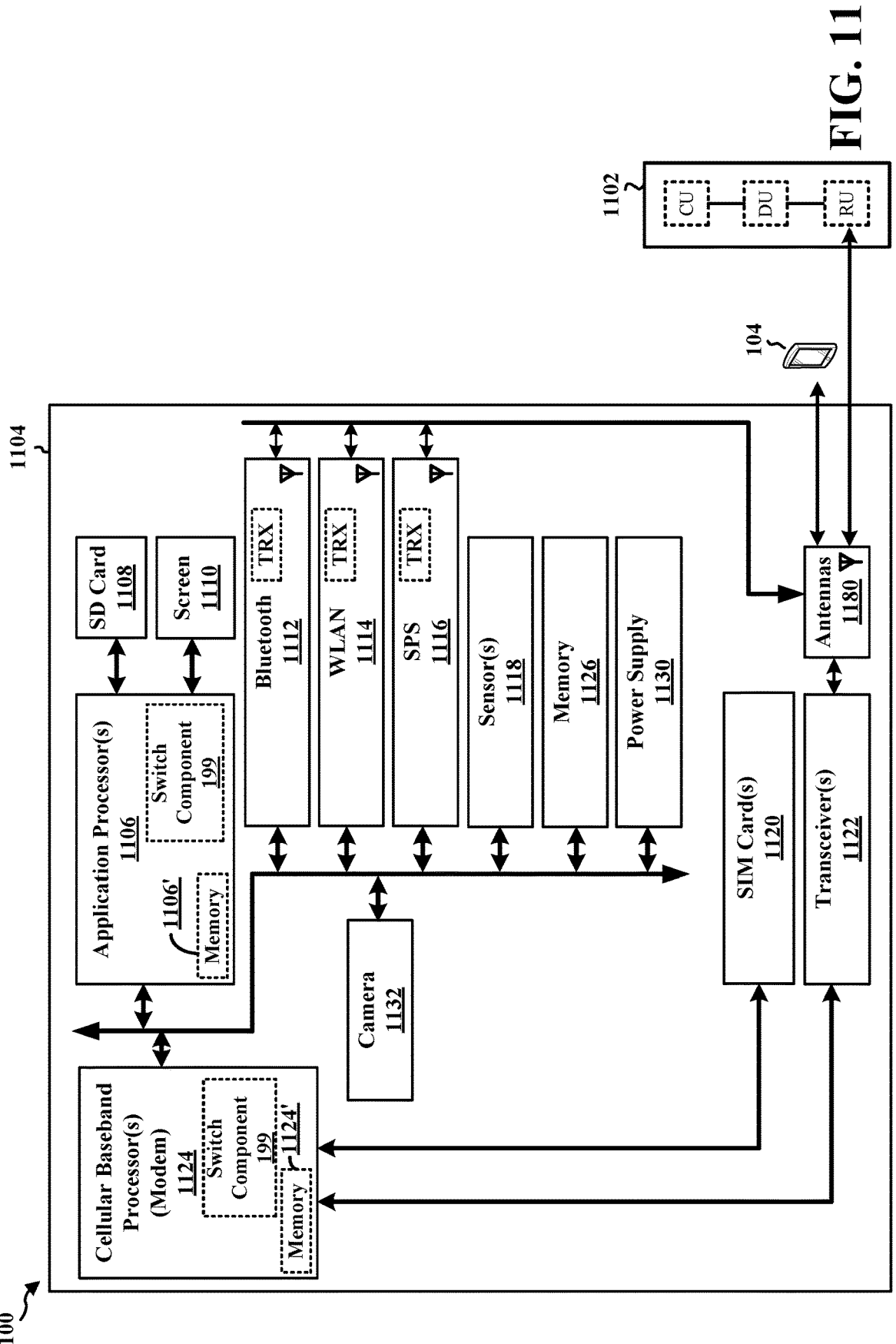
FIG. 11 is a diagram illustrating an example of a hardware implementation for an example network entity.

FIG. 11 is a diagram 1100 illustrating an example of a hardware implementation for an apparatus 1104. In some aspects, the apparatus 1104 may be a UE, a component of a UE, or may implement UE functionality. In some aspects, the apparatus may be a device having reduced complexity, such as an XR device. In some aspects, the apparatus 1104 may include at least one cellular baseband processor 1124 (also referred to as a modem) coupled to one or more transceivers 1122 (e.g., cellular RF transceiver). The cellular baseband processor(s) 1124 may include at least one on-chip memory 1124'. In some aspects, the apparatus 1104 may further include one or more subscriber identity modules (SIM) cards 1120 and at least one application processor 1106 coupled to a secure digital (SD) card 1108 and a screen 1110. The application processor(s) 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor(s) 1124 communicates through the transceiver(s) 1122 via one or more antennas 1180 with the UE 104 and/or with an RU associated with an apparatus 1102. The cellular baseband processor(s) 1124 and the application processor(s) 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor(s) 1124 and the application processor(s) 1106 are each responsible for general processing, including the execution of software stored on the computer-readable medium/memory. The software, when executed by the cellular baseband processor(s) 1124/application processor(s) 1106, causes the cellular baseband processor(s) 1124/application processor(s) 1106 to perform the various functions described supra. The cellular baseband processor(s) 1124 and the application processor(s) 1006 are configured to perform the various functions described supra based at least in part of the information stored in the memory. That is, the cellular baseband processor(s) 1124 and the application processor(s) 1106 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1124/application processor(s) 1106 when executing software. The cellular baseband processor(s) 1124/application processor(s) 1106 may be a component of the UE 350 and may include the at least one memory 360 and/or at least one of the TX processor 368, the RX processor 356, and the controller/processor 359. In one configuration, the apparatus 1104 may be at least one processor chip (modem and/or application) and include just the cellular baseband processor(s) 1124 and/or the application processor(s) 1106, and in another configuration, the apparatus 1104 may be the entire UE (e.g., see UE 350 of FIG. 3) and include the additional modules of the apparatus 1104.

As discussed supra, the component 199 may be configured to monitor for a transmission from a first wireless device based on a pre-equalization type; and receive the transmission from the first wireless device based on the pre-equalization type. The component 199 may be within the cellular baseband processor(s) 1124, the application processor(s) 1106, or both the cellular baseband processor(s) 1124 and the application processor(s) 1106. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1104 may include a variety of components configured for various functions. In one configuration, the apparatus 1104, and in particular the cellular baseband processor(s) 1124 and/or the application processor(s) 1106, may include means for monitoring for a transmission from a first wireless device based on a pre-equalization type. The apparatus includes means for receiving the transmission from the first wireless device based on the pre-equalization type. The apparatus further includes means for receiving a switch indication indicating a switch from the first pre-equalization type to a second pre-equalization type at the first wireless device. The apparatus further includes means for receiving a second transmission from the first wireless device based on the second pre-equalization type. The apparatus further includes means for transmitting or receiving a capability indication indicating support of at least one equalization type, wherein the at least one equalization type comprises at least one of a linear pre-equalization type, a non-linear pre-equalization type, or a receiver equalization type. The apparatus further includes means for obtaining a switch request to initiate the switch from the first pre-equalization type to the second pre-equalization type based at least on an estimation of at least one of Doppler, SNR, or rank. The apparatus further includes means for providing switch instructions to perform the switch to the second pre-equalization type based on the switch request. The apparatus further includes means for initiating the switch based on an estimation of at least one of the Doppler, SNR, or rank. The apparatus further includes means for providing switch instructions based on the estimation of at least one of the Doppler, SNR, or rank. The means may be the component 199 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/ processor 359 configured to perform the functions recited by the means.

Figure 12:
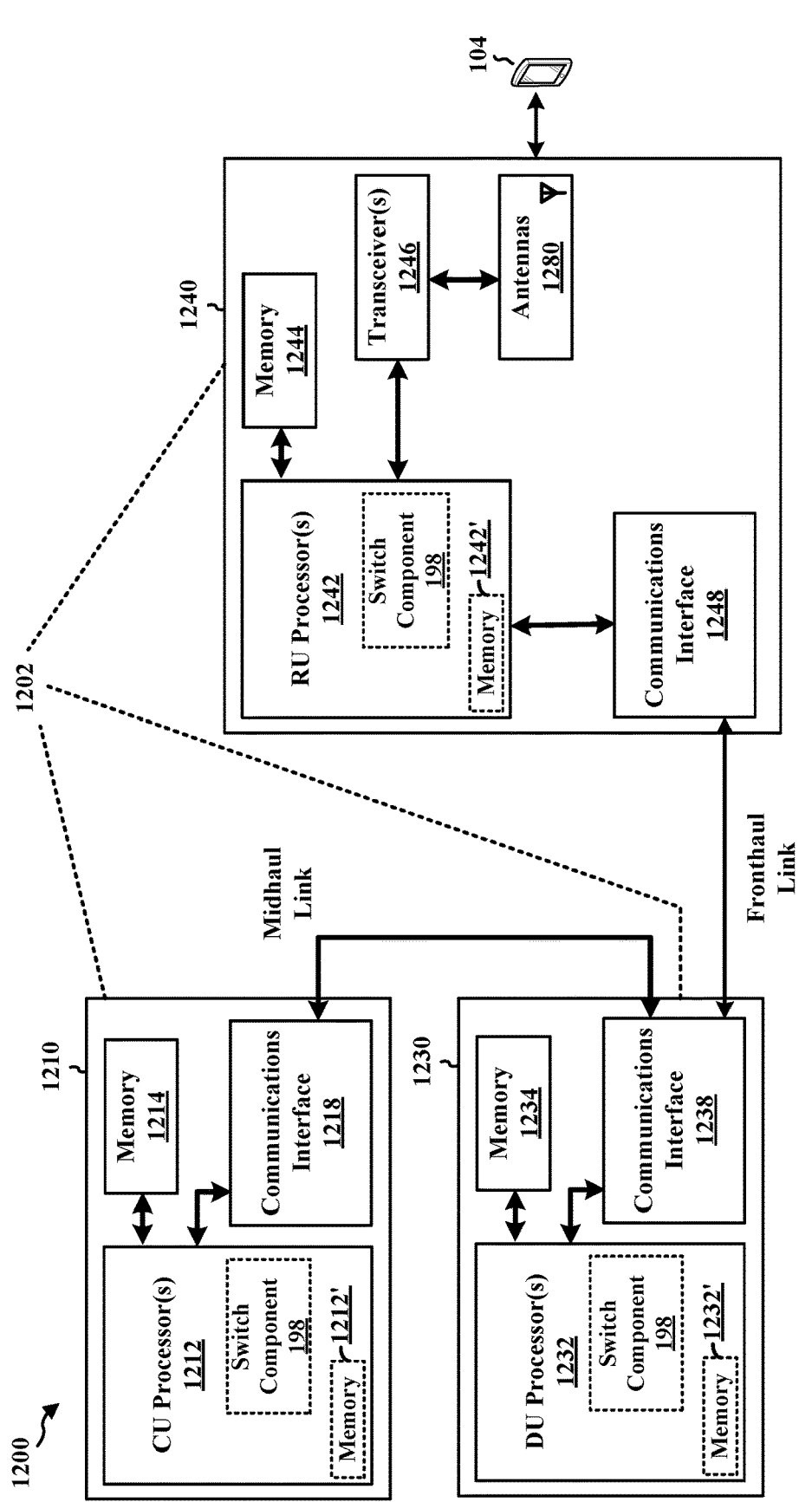
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 198, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include at least one CU processor 1212. The CU processor(s) 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include at least one DU processor 1232. The DU processor(s) 1232 may include on-chip memory 1232'. In some aspects, the DU 1230 may further include additional memory modules 1234 and a communications interface 1238. The DU 1230 communicates with the RU 1240 through a fronthaul link. The RU 1240 may include at least one RU processor 1242. The RU processor(s) 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the component 198 may be configured to select a pre-equalization type based on a pre-equalization criteria; and transmit a transmission to a second wireless device based on the pre-equalization type. The component 198 may be within one or more processors of one or more of the CU 1210, DU 1230, and the RU 1240. The component 198 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1202 may include a variety of components configured for various functions. In one configuration, the network entity 1202 may include means for selecting a pre-equalization type based on a pre-equalization criteria. The network entity includes means for transmitting a transmission to a second wireless device based on the pre-equalization type. The network entity further includes means for switching from the first pre-equalization type to a second pre-equalization type based on a switch criteria. The network entity further includes means for transmitting a second transmission to the second wireless device based on the second pre-equalization type. The network entity further includes means for transmitting a switch request to initiate the switch based at least on an estimation of at least one of Doppler, SNR, or rank. The network entity further includes means for receiving switch instructions to perform the switch to the second pre-equalization type based on the switch request. The network entity further includes means for receiving switch instructions to perform the switch to the second pre-equalization type based on an estimation of at least one of Doppler, SNR. The network entity further includes means for transmitting a capability indication indicating support of at least one equalization type. The network entity further includes means for switching to a non-linear pre-equalization type in response to the estimated Doppler is less than a first threshold. The network entity further includes means for switching to a linear pre-equalization type in response to the estimated Doppler is greater that the first threshold and less than a second threshold. The network entity further includes means for switching to a receiver equalization type in response to the estimated Doppler is greater than the second threshold. The network entity further includes means for switching to a non-linear pre-equalization type or a linear pre-equalization type when the estimated SNR is greater than or less than an SNR threshold. The network entity further includes means for switching to at least one of a linear pre-equalization type, a non-linear pre-equalization type, or a receiver equalization type based on the elapsed time from the previous channel estimation update. The network entity further includes means for switching to at least one of a linear pre-equalization type, a non-linear pre-equalization type, or a receiver equalization type based on a channel correlation at the transmission antennas. The means may be the component 198 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/ processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device comprising selecting a pre-equalization type based on a pre-equalization criteria; and transmitting a transmission to a second wireless device based on the pre-equalization type.

Aspect 2 is the method of aspect 1, further including switching from the first pre-equalization type to a second pre-equalization type based on a switch criteria; and transmitting a second transmission to the second wireless device based on the second pre-equalization type.

Aspect 3 is the method of any of aspects 1 and 2, further including switching between a linear pre-equalization and a non-linear pre-equalization at the first wireless device.

Aspect 4 is the method of any of aspects 1-3, further including switching between a linear pre-equalization at the first wireless device and a receiver equalization type.

Aspect 5 is the method of any of aspects 1-4, further including switching between a non-linear pre-equalization and a receiver equalization type at the first wireless device.

Aspect 6 is the method of any of aspects 1-5, further including transmitting a switch request to initiate the switch based at least on an estimation of at least one of Doppler, SNR, or rank; and receiving switch instructions to perform the switch to the second pre-equalization type based on the switch request.

Aspect 7 is the method of any of aspects 1-6, further including receiving switch instructions to perform the switch to the second pre-equalization type based on an estimation of at least one of Doppler, SNR.

Aspect 8 is the method of any of aspects 1-7, further including transmitting a capability indication indicating support of at least one equalization type.

Aspect 9 is the method of any of aspects 1-8, further includes that the at least one equalization type comprises at least one of a linear pre-equalization type, a non-linear pre-equalization type, or a receiver equalization type.

Aspect 10 is the method of any of aspects 1-9, further includes that the switch criteria is based on at least one of an estimated Doppler, an estimated SNR, or an elapsed time from a previous channel estimation update.

Aspect 11 is the method of any of aspects 1-10, further includes that the switch criteria is based on the estimated Doppler, further including switching to a non-linear pre-equalization type in response to the estimated Doppler is less than a first threshold, switching to a linear pre-equalization type in response to the estimated Doppler is greater that the first threshold and less than a second threshold, or switching to a receiver equalization type in response to the estimated Doppler is greater than the second threshold.

Aspect 12 is the method of any of aspects 1-11, further includes that the switch criteria is based on the estimated SNR, further including switching to a non-linear pre-equalization type or a linear pre-equalization type when the estimated SNR is greater than or less than an SNR threshold.

Aspect 13 is the method of any of aspects 1-12, further includes that the switch criteria is based on the elapsed time, further including switching to at least one of a linear pre-equalization type, a non-linear pre-equalization type, or a receiver equalization type based on the elapsed time from the previous channel estimation update.

Aspect 14 is the method of any of aspects 1-13, further includes that the switch criteria is based at least on transmission antennas, further including switching to at least one of a linear pre-equalization type, a non-linear pre-equalization type, or a receiver equalization type based on a channel correlation at the transmission antennas.

Aspect 15 is the method of any of aspects 1-14, further includes that the switch criteria is based at least on a combination of one or more of the transmission antennas, the estimated Doppler, the estimated SNR, or the elapsed time from the previous channel estimation update.

Aspect 16 is the method of any of aspects 1-15, further includes that a selection of the second pre-equalization type is indicated by at least one of DCI, MAC-CE, or RRC signaling.

Aspect 17 is an apparatus for wireless communication at a first wireless device including at least one processor coupled to a memory and at least one transceiver, the at least one processor configured to implement any of aspects 1-16.

Aspect 18 is an apparatus for wireless communication at a first wireless device including means for implementing any of aspects 1-16.

Aspect 19 is a computer-readable medium storing computer executable code, where the code when executed by a processor causes the processor to implement any of aspects 1-16.

Aspect 20 is a method of wireless communication at a second wireless device comprising monitoring for a transmission from a first wireless device based on a pre-equalization type; and receiving the transmission from the first wireless device based on the pre-equalization type.

Aspect 21 is the method of aspect 20, further includes that the pre-equalization type is a first pre-equalization type further including receiving a switch indication indicating a switch from the first pre-equalization type to a second pre-equalization type at the first wireless device; and receiving a second transmission from the first wireless device based on the second pre-equalization type.

Aspect 22 is the method of any of aspects 20 and 21, further includes that the switch is between two of a linear pre-equalization type, a non-linear pre-equalization type, and a receiver equalization type.

Aspect 23 is the method of any of aspects 20-22, further includes that the switch indication is comprised in at least one of DCI, MAC-CE, or RRC signaling that indicates the second pre-equalization type.

Aspect 24 is the method of any of aspects 20-23, further including transmitting or receiving a capability indication indicating support of at least one equalization type, wherein the at least one equalization type comprises at least one of a linear pre-equalization type, a non-linear pre-equalization type, or a receiver equalization type.

Aspect 25 is the method of any of aspects 20-24, further includes that the switch from the first pre-equalization type to the second pre-equalization type is initiated by the first wireless device further including obtaining a switch request to initiate the switch from the first pre-equalization type to the second pre-equalization type based at least on an estimation of at least one of Doppler, SNR, or rank; and providing switch instructions to perform the switch to the second pre-equalization type based on the switch request.

Aspect 26 is the method of any of aspects 20-25, further includes that the switch from the first pre-equalization type to the second pre-equalization type is initiated by the second wireless device further including initiating the switch based on an estimation of at least one of the Doppler, SNR, or rank; and providing switch instructions based on the estimation of at least one of the Doppler, SNR, or rank.

Aspect 27 is an apparatus for wireless communication at a second wireless device including at least one processor coupled to a memory and at least one transceiver, the at least one processor configured to implement any of aspects 20-26.

Aspect 28 is an apparatus for wireless communication at a second wireless device including means for implementing any of aspects 20-26.

Aspect 29 is a computer-readable medium storing computer executable code, where the code when executed by a processor causes the processor to implement any of aspects 20-26.

What is claimed is:

1. An apparatus for wireless communication at a first wireless device, comprising:
   at least one memory; and
   at least one processor coupled to the at least one memory and, based at least in part on information stored in the at least one memory, the at least one processor, is configured to cause the apparatus to:
   select, based on a pre-equalization criteria, a pre-equalization type, wherein the pre-equalization type is selected from at least two of a linear pre-equalization type, a non-linear pre-equalization equalization type, and a receiver equalization type at a second wireless device;
   receive a transmission from a network node for the second wireless device; and
   transmit the transmission to the second wireless device based on the pre-equalization type.

2. The apparatus of claim 1, further comprising a transceiver coupled to the at least one processor, wherein the at least one processor is configured to: transmit, via the transceiver, the transmission to the second wireless device based on the pre-equalization type.

3. The apparatus of claim 1, wherein the pre-equalization type is a first pre-equalization type, wherein the at least one processor is configured to:
   switch from the first pre-equalization type to a second pre-equalization type based on a switch criteria;
   receive a second transmission from the network node for the second wireless device; and
   transmit the second transmission to the second wireless device based on the second pre-equalization type.

4. The apparatus of claim 3, wherein to switch to the second pre-equalization type the at least one processor is configured to:
   switch between the linear pre-equalization type and the non-linear pre-equalization type at the first wireless device.

5. The apparatus of claim 3, wherein to switch to the second pre-equalization type the at least one processor is configured to:
   switch between the linear pre-equalization type at the first wireless device and the receiver equalization type.

6. The apparatus of claim 3, wherein to switch to the second pre-equalization type the at least one processor is configured to:
   switch between the non-linear pre-equalization type and the receiver equalization type.

7. The apparatus of claim 3, wherein to switch to the second pre-equalization type is initiated by the first wireless device, wherein the at least one processor is configured to:
   transmit a switch request to initiate the switch based at least on an estimation of at least one of Doppler, signal to noise ratio (SNR), or rank; and
   receive switch instructions to perform the switch to the second pre-equalization type based on the switch request.

8. The apparatus of claim 3, wherein to switch to the second pre-equalization type is initiated by the second wireless device, wherein the at least one processor is configured to:

receive switch instructions to perform the switch to the second pre-equalization type based on an estimation of at least one of Doppler, signal to noise ratio (SNR).

9. The apparatus of claim 3, wherein the switch criteria is based on at least one of an estimated Doppler, an estimated signal to noise ratio (SNR), or an elapsed time from a previous channel estimation update.

10. The apparatus of claim 9, wherein the switch criteria is based on the estimated Doppler, wherein to switch to the second pre-equalization type the at least one processor is configured to:

switch to the non-linear pre-equalization type in response to the estimated Doppler is less than a first threshold, switch to the linear pre-equalization type in response to the estimated Doppler is greater that the first threshold and less than a second threshold, or switch to the receiver equalization type in response to the estimated Doppler is greater than the second threshold.

11. The apparatus of claim 9, wherein the switch criteria is based on the estimated SNR, wherein to switch to the second pre-equalization type the at least one processor is configured to:

switch to the non-linear pre-equalization type or the linear pre-equalization type when the estimated SNR is greater than or less than an SNR threshold.

12. The apparatus of claim 9, wherein the switch criteria is based on the elapsed time, wherein to switch to the second pre-equalization type the at least one processor is configured to:

switch to at least one of the linear pre-equalization type, the non-linear pre-equalization type, or the receiver equalization type based on the elapsed time from the previous channel estimation update.

13. The apparatus of claim 9, wherein the switch criteria is based at least on transmission antennas, wherein to switch to the second pre-equalization type the at least one processor is configured to:

switch to at least one of the linear pre-equalization type, the non-linear pre-equalization type, or the receiver equalization type based on a channel correlation at the transmission antennas.

14. The apparatus of claim 13, wherein the switch criteria is based at least on a combination of one or more of the transmission antennas, the estimated Doppler, the estimated SNR, or the elapsed time from the previous channel estimation update.

15. The apparatus of claim 3, wherein a selection of the second pre-equalization type is indicated by at least one of downlink control information (DCI), media access control (MAC) control element (CE) (MAC-CE), or radio resource control (RRC) signaling.

16. The apparatus of claim 1, wherein the at least one processor is configured to:

transmit a capability indication indicating support of at least one equalization type.

17. A method of wireless communication at first wireless device, comprising:

selecting, based on a pre-equalization criteria, a pre-equalization type, wherein the pre-equalization type is selected from at least two of a linear pre-equalization type, a non-linear pre-equalization type, and a receiver equalization type at a second wireless device;

receiving a transmission from a network node for the second wireless device; and transmitting the transmission to the second wireless device based on the pre-equalization type.

18. The method of claim 17, wherein the pre-equalization type is a first pre-equalization type, the method further comprising:

switching from the first pre-equalization type to a second pre-equalization type based on a switch criteria;

receiving a second transmission from the network node for the second wireless device; and transmitting the second transmission to the second wireless device based on the second pre-equalization type.

19. The method of claim 18, wherein switching to the second pre-equalization type includes:

switching between the linear pre-equalization type and the non-linear pre-equalization equalization type at the first wireless device, switching between the linear pre-equalization type at the first wireless device and the receiver equalization type, or switching between the non-linear pre-equalization type and the receiver equalization type.

20. The method of claim 19, wherein the switch criteria is based on at least one of an estimated Doppler, an estimated signal to noise ratio (SNR), or an elapsed time from a previous channel estimation update.

21. An apparatus for wireless communication at a second wireless device, comprising:

at least one memory; and at least one processor coupled to the at least one memory and, based at least in part on information stored in the at least one memory, the at least one processor, is configured to cause the apparatus to:

receive an indication of a pre-equalization type selected from at least two of a linear pre-equalization type, a non-linear pre-equalization type, and a receiver equalization type at the second wireless device based on a pre-equalization criteria;

monitor for a transmission from a network node via a first wireless device based on the pre-equalization type; and receive the transmission from the first wireless device based on the pre-equalization type.

22. The apparatus of claim 21, further comprising a transceiver coupled to the at least one processor, the transceiver being configured to:

receive the transmission from the first wireless device based on the pre-equalization type.

23. The apparatus of claim 21, wherein the pre-equalization type is a first pre-equalization equalization type, wherein the at least one processor is configured to:

receive a switch indication indicating a switch from the first pre-equalization type to a second pre-equalization type at the first wireless device; and receive a second transmission from the first wireless device based on the second pre-equalization type.

24. The apparatus of claim 23, wherein the switch is between two of:

the linear pre-equalization type, the non-linear pre-equalization type, and the receiver equalization type.

25. The apparatus of claim 23, wherein the switch indication is comprised in at least one of downlink control information (DCI), media access control (MAC) control element (CE) (MAC-CE), or radio resource control (RRC) signaling that indicates the second pre-equalization type.

26. The apparatus of claim 25, wherein the at least one processor is configured to:

transmit or receive a capability indication indicating support of at least one equalization type, wherein the at least one equalization type comprises at least one of the linear pre-equalization type, the non-linear pre-equalization type, or the receiver equalization type.

27. The apparatus of claim 23, wherein the switch from the first pre-equalization type to the second pre-equalization type is initiated by the first wireless device, wherein the at least one processor is configured to:

obtain a switch request to initiate the switch from the first pre-equalization type to the second pre-equalization type based at least on an estimation of at least one of Doppler, signal to noise ratio (SNR), or rank; and provide switch instructions to perform the switch to the second pre-equalization type based on the switch request.

28. The apparatus of claim 23, wherein the switch from the first pre-equalization type to the second pre-equalization type is initiated by the second wireless device, wherein the at least one processor is configured to:

initiate the switch based on an estimation of at least one of Doppler, signal to noise ratio (SNR), or rank; and provide switch instructions based on the estimation of at least one of the Doppler, the SNR, or the rank.

29. A method of wireless communication at a second wireless device, comprising:

receiving an indication of a pre-equalization type selected from at least two of a linear pre-equalization type, a non-linear pre-equalization type, and a receiver equalization type at the second wireless device based on a pre-equalization criteria;

monitoring for a transmission from a network node via a first wireless device based on the pre-equalization type; and receiving the transmission from the first wireless device based on the pre-equalization type.

30. The method of claim 29, wherein the pre-equalization type is a first pre-equalization type, the method further comprising:

receiving a switch indication indicating a switch from the first pre-equalization type to a second pre-equalization type at the first wireless device; and receiving a second transmission from the first wireless device based on the second pre-equalization type.

* * * * *